United States Patent
Yanagisawa

(10) Patent No.: US 9,651,748 B2
(45) Date of Patent: May 16, 2017

(54) OPTICAL MODULE

(71) Applicant: SHINKO ELECTRIC INDUSTRIES CO., LTD., Nagano-shi, Nagano (JP)

(72) Inventor: Kenji Yanagisawa, Nagano (JP)

(73) Assignee: SHINKO ELECTRIC INDUSTRIES CO., LTD., Nagano-Shi (JP)

( * ) Notice: Subject to any disclaimer, the term of this patent is extended or adjusted under 35 U.S.C. 154(b) by 0 days.

(21) Appl. No.: 15/071,478

(22) Filed: Mar. 16, 2016

(65) Prior Publication Data
US 2016/0313519 A1    Oct. 27, 2016

(30) Foreign Application Priority Data

Apr. 23, 2015    (JP) .................................. 2015-088177

(51) Int. Cl.
| | | |
|---|---|---|
| *G02B 6/42* | (2006.01) | |
| *G02B 6/43* | (2006.01) | |
| G02B 6/32 | (2006.01) | |
| G02B 6/30 | (2006.01) | |

(52) U.S. Cl.
CPC ........... *G02B 6/4244* (2013.01); *G02B 6/428* (2013.01); *G02B 6/4214* (2013.01); G02B 6/30 (2013.01); G02B 6/322 (2013.01); G02B 6/4206 (2013.01); G02B 6/4238 (2013.01); G02B 6/4239 (2013.01); G02B 6/43 (2013.01)

(58) Field of Classification Search
CPC .............................. G02B 6/4244; G02B 6/428
See application file for complete search history.

(56) References Cited

U.S. PATENT DOCUMENTS

| | | | | |
|---|---|---|---|---|
| 7,212,698 B2 * | 5/2007 | Bapst | ....................... | G02B 6/42 385/129 |
| 7,221,829 B2 * | 5/2007 | Oono | ................... | G02B 6/4201 385/52 |
| 9,417,393 B2 * | 8/2016 | Yanagisawa | ........... | G02B 6/322 |
| 2015/0036984 A1 * | 2/2015 | Wang | ................... | G02B 6/4214 385/89 |

FOREIGN PATENT DOCUMENTS

JP    2005-084165    3/2005

* cited by examiner

*Primary Examiner* — Omar R Rojas
(74) *Attorney, Agent, or Firm* — Rankin, Hill & Clark LLP

(57) ABSTRACT

An optical module includes: an optical/electrical composite board including: a wiring board; an optical waveguide disposed on the wiring board; and a first optical path changing portion disposed at one end portion of the optical waveguide, a lens component including a lens configured to collect the light emitted from the optical path changing portion; and a fixation member fixed to the optical/electrical composite board. A through hole is formed through the lens component. The lens component is disposed on the optical/electrical composite board such that the fixation member is disposed in the through hole. A resin portion is provided in the through hole such that the fixation member is embedded in the resin portion.

7 Claims, 10 Drawing Sheets

OPTICAL MODULE

This application claims priority from Japanese Patent Application No. 2015-088177, filed on Apr. 23, 2015, the entire contents of which are herein incorporated by reference.

BACKGROUND OF THE INVENTION

1. Technical Field

The present invention relates to an optical module.

2. Description of the Related Art

There has been known an optical/electrical composite board in which optical waveguides are disposed on a wiring board such as a printed circuit board (PCB) so that electric interconnection and optical interconnection are mixed inside the wiring board.

Each of the optical waveguides has a configuration in which a core layer is surrounded by clad layers. The optical path of a light beam travelling in the core layer is changed by an optical path changing portion to be directed in a direction perpendicular to the surface of the wiring board. The optical path changing portion is provided at an end portion of the optical waveguide. For example, the light beam emitted vertically from the optical path changing portion enters an optical fiber mounted on the wiring board so as to be transmitted as an optical signal to the outside.

In this case, a lens component for collecting light beams emitted from the optical path changing portions is mounted on the wiring board. In this manner, the light beams collected by the lens component can be made to enter the optical fibers. Accordingly, it is possible to reduce a loss in transmission of the light beams.

For example, JP-A-2005-84165 discloses a method in which through holes used for alignment are formed in a wiring board and a lens component respectively so that the lens component can be muffled on the wiring board when a guide pin is fitted into the through holes.

However, according to the method, it is necessary to secure a region for forming the through hole in the wiring board. For this reason, it is however difficult to apply the method to a high-density miniaturized wiring board.

Also, a method for bonding a lens component onto a wiring board by use of an adhesive agent has been considered as the method for mounting the lens component on the wiring board.

However, in order to make light beams collected by the lens component enter the optical fibers, it is necessary to mount an optical fiber connector on the lens component. In this case, when the optical fiber connector is detached from the lens component, there is a possibility that large stress may act on the bonded portion between the wiring board and the lens component to thereby make the lens component come off from the wiring board. Although it is possible to enhance adhesive strength by increasing a contact area between the lens component and the wiring board, this may lead to enlargement of the lens component so that it is difficult to apply this to a high-density miniaturized wiring board.

SUMMARY OF THE INVENTION

According to one or more aspects of the present invention, there is provided an optical module. The optical module includes: an optical/electrical composite board including: a wiring board; an optical waveguide disposed on the wiring board and configured to guide light; and a first optical path changing portion disposed at one end portion of the optical waveguide to change an optical path of the light travelling in the optical waveguide, a lens component including a lens configured to collect the light emitted from the optical path changing portion; and a fixation member fixed to the optical/electrical composite board. A through hole is formed through the lens component. The lens component is disposed on the optical/electrical composite board such that the fixation member is disposed in the through hole. A resin portion is provided in the through hole such that the fixation member is embedded in the resin portion.

According to one or more aspects of the present invention, it is possible to provide an optical module that can increase adhesive strength of the lens component to the optical/electrical composite board including the optical waveguide and the wiring board.

DETAILED DESCRIPTION

Embodiments will be described below respectively with reference to the accompanying drawings. Incidentally, a characteristic part is enlarged and shown in some accompanying drawings for convenience's sake in order to make it easy to understand that characteristic, and the dimensional ratios etc. of respective constituent elements do not always agree with real ones. In addition, hatching of a part of members is omitted in each sectional view in order to make it easy to understand the sectional structure of each member.

Figure 1:
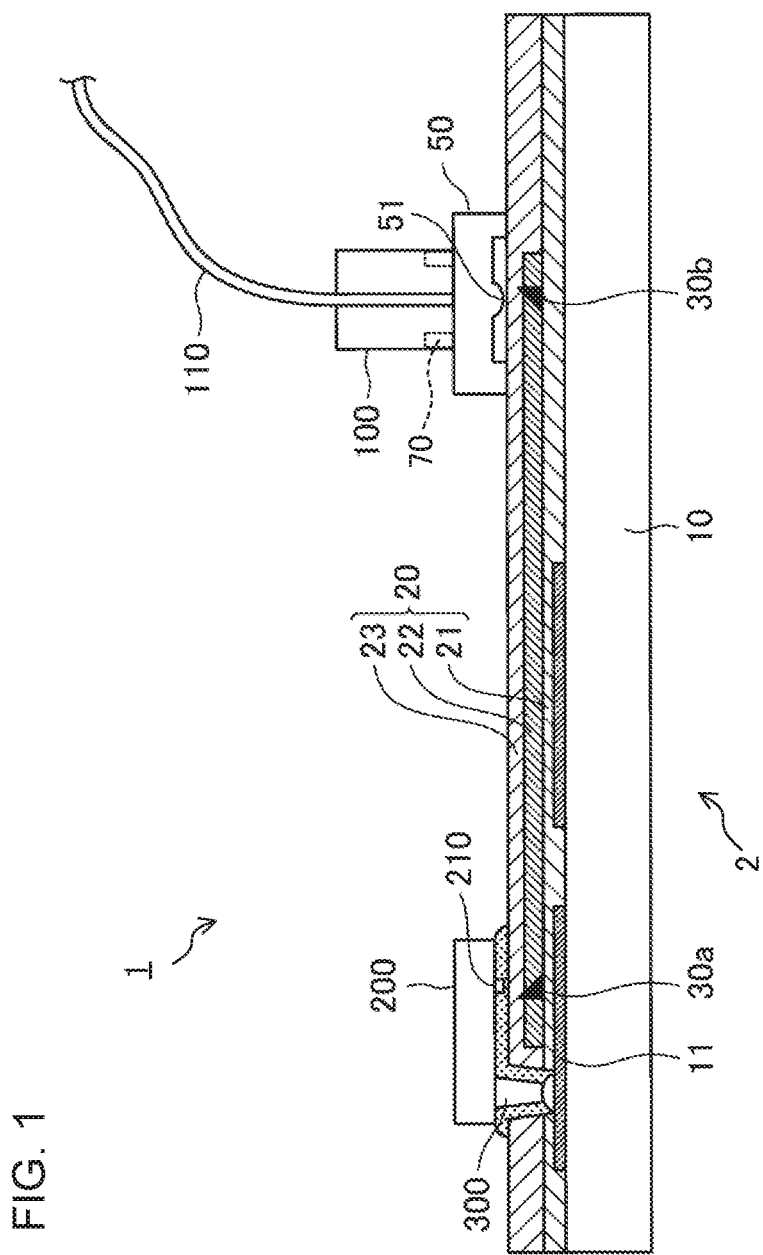
FIG. 1 is a sectional view schematically showing the configuration of an optical module according to an embodiment of the present invention, in which a lens component is mounted on an optical/electrical composite board.

FIG. 1 is a sectional view schematically showing the configuration of an optical module 1 where a lens component 50 is mounted on an optical/electrical composite board 2 including optical waveguides 20 and a wiring board 10.

As shown in FIG. 1, the optical/electrical composite board 2 includes the wiring board 10, the optical waveguides 20 disposed on the wiring board 10, and optical path changing mirrors 30a and 30b. Each of the optical waveguides 20 includes a core layer 22, and clad layers 21 and 23 which are formed on a lower side and an upper side of the core layer 22 respectively. The core layers 22 are formed as strip patterns and arranged in parallel with each other on an upper surface of the wiring board 10. Optical path changing mirrors 30a (one example of a first optical path changing portion) and optical path changing mirrors 30b (one example of a second optical path changing portion) are disposed at opposite end portions of each core layer 22. A light-emitting element 200 (one example of an optical element) is mounted above the wiring board 10 and in a position corresponding to the optical path changing mirror 30a at one end portion of the core layer 22. A light-emitting portion 210 of the light-emitting element 200 is disposed just above the optical path changing mirror 30a. In this manner, the light-emitting portion 210 of the light-emitting element 200 is optically coupled to the optical path changing mirror 30a. In addition, a connection terminal 300 of the light-emitting element 200 is connected to a corresponding connection pad 11 formed on the wiring board 10. In addition, a light-receiving element may be provided instead of the light-emitting element 200.

In addition, a lens component 50 is mounted on the optical/electrical composite board 2 in a position corresponding to the optical path changing mirrors 30b at the other end portions of the core layers 22. In other words, the lens component 50 is disposed above the wiring board 10. Lenses 51 arranged in the lens component 50 are disposed just above the optical path changing mirrors 30b respectively. In this manner, the lenses 51 are optically coupled to the optical path changing mirrors 30b respectively. Also, an optical fiber connector 100 is mounted on the lens component 50. In this regard, a corresponding one of pins 70 (one example of a mounting portion) provided on the upper surface of the lens component 50 is inserted into each of insertion holes (not shown) formed in the optical fiber connector 100, and thus the optical fiber connector 100 can be mounted on the lens component 50. Meanwhile, such a configuration may be employed that pins are provided in the optical fiber connector 100 and insertion holes for receiving the pins are formed in the lens component 50. In this case, the insertion holes formed in the lens component 50 serve as a mounting portion.

With such a configuration, light beams emitted from the light-emitting portions 210 of the light-emitting elements 200 are reflected by the optical path changing mirrors 30a, propagated through the core layers 22, and reflected again by the optical path changing mirrors 30b so as to be incident on the lenses 51 of the lens component 50. The light beams collected by the lens 51 are made incident on optical fibers 110 through the optical fiber connector 100.

Incidentally, in the present embodiment, for convenience's sake, surfaces of the respective constituent parts of the optical module 1 on the optical fiber connector 110 side will be referred to as upper surfaces, and surfaces of the same constituent parts on the optical/electrical composite board 2 side will be referred to as lower surfaces. However, the optical module 1 can be used in an upside-down state or can be disposed at any angle. In addition, the term "plan view" means a view of an object from a normal direction of the upper surface of the optical module. The term "planar shape" means the shape of the object viewed from the normal direction of the upper surface of the optical module.

Next, a method for manufacturing the optical module 1 will be described with reference to FIGS. 2A to 2C, FIGS. 3A to 3C, FIGS. 5A to 5C and FIGS. 9A to 9C. In the embodiment, in the configuration of the optical module shown in FIG. 1, only the configuration of a portion where the lens component 50 is mounted will be shown but the configuration of a portion where the light-emitting elements 200 are mounted will be omitted.

Figure 2A:
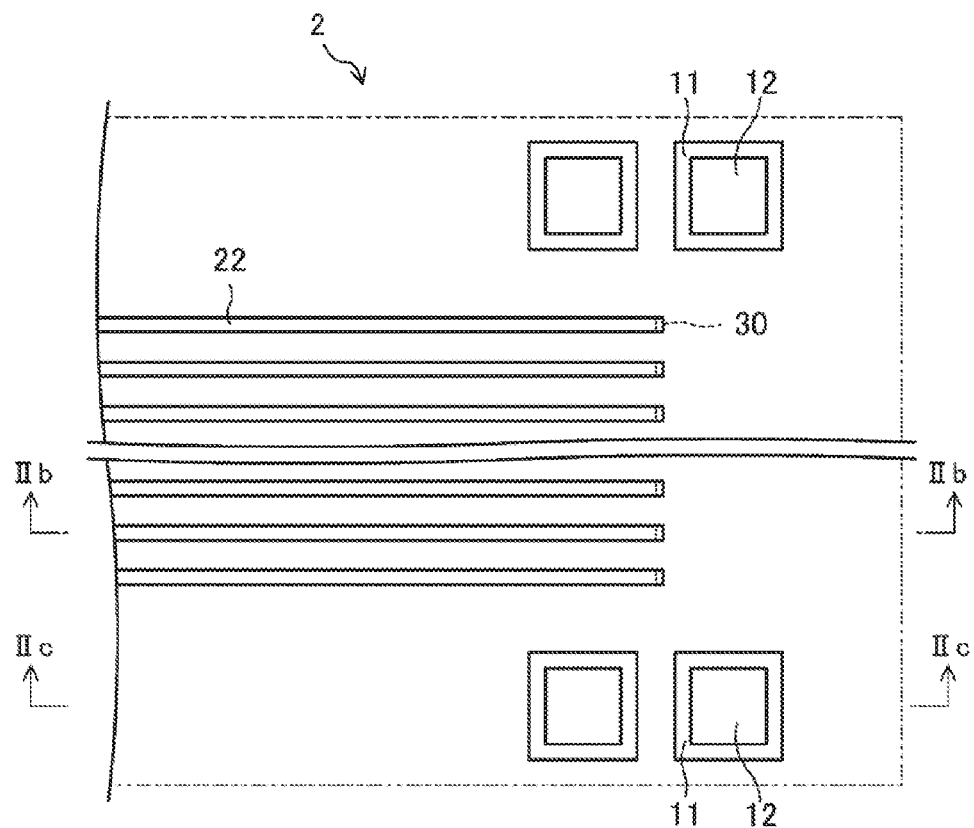
FIG. 2A is a plan view showing a step of a method for manufacturing the optical module according to the embodiment.
Figure 2B:
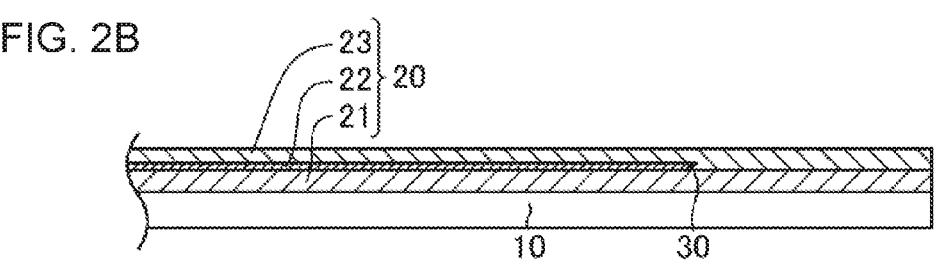
FIG. 2B is a sectional view taken along a line IIb-IIb of FIG. 2A.
Figure 2C:
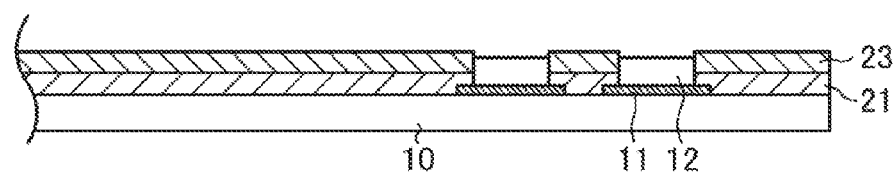
FIG. 2C is a sectional view taken along a line of IIc-IIc of FIG. 2A.

First, an optical/electrical composite board 2 including a wiring board 10 and an optical waveguides 20 disposed on the upper surface of the wiring board 10 are prepared as shown in FIGS. 2A to 2C. FIG. 2A is a plan view of the optical/electrical composite board 2. FIG. 2B is a sectional view taken along a line IIb-IIb of FIG. 2A. FIG. 2C is a sectional view taken along a line IIc-IIc of FIG. 2A.

As shown in FIG. 2B, each of the optical waveguides 20 includes a core layer 22, and clad layers 21 and 23 formed on a lower side and an upper side of the core layer 22 respectively. The optical waveguides 20 are bonded and fixed to the upper surface of the wiring board 10, for example, by an adhesive agent. In addition, as shown in FIG. 2A, the core layers 22 are formed as strip-like patterns, and arranged in parallel with each other on the upper surface of the wiring board 10. Optical path changing mirrors (optical path changing portions) 30 are disposed at one end portions of the core layers 22 respectively.

Incidentally, as shown in FIG. 1, optical path changing mirrors (not shown) are disposed at the other end portions of the core layers 22, and light-emitting elements (not shown) are mounted on the wiring board 10 and in positions corresponding to the optical path changing mirrors.

In the embodiment, as shown in FIG. 2C, connection pads 11 are formed on the upper surface of the wiring board 10 in regions where the core layers 22 are not formed and in the vicinities of the end portions of the core layers 22 where the optical path changing mirrors 30 are disposed. Further, the clad layers 21 and 23 on the connection pad 11 are opened and solders 12 are formed on the connection pads 11.

Figure 3A:
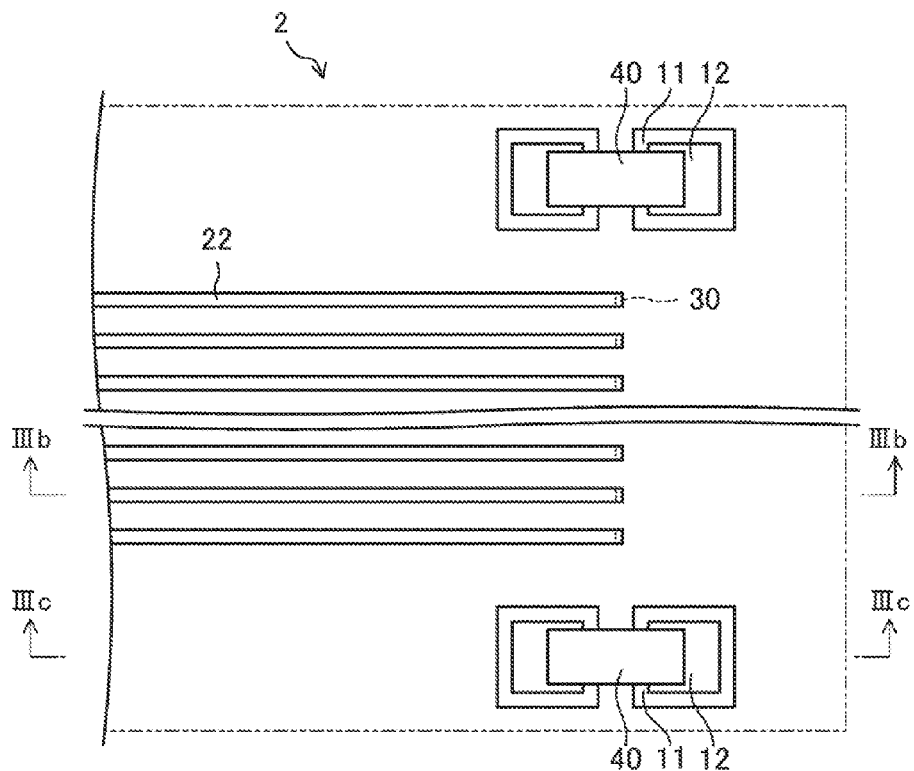
FIG. 3A is a plan view showing a step of the method for manufacturing the optical module according to the embodiment.
Figure 3B:
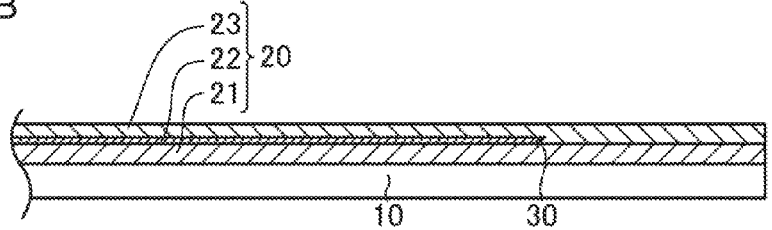
FIG. 3B is a sectional view taken along a line IIIb-IIIb of FIG. 3A.
Figure 3C:
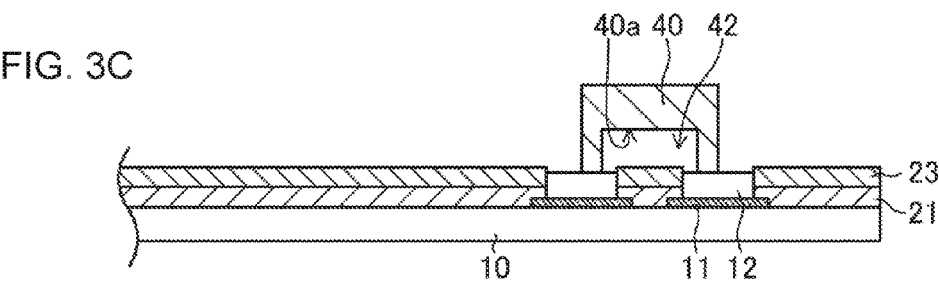
FIG. 3C is a sectional view taken along a line of IIIc-IIIc of FIG. 3A.

Next, as shown in FIGS. 3A to 3C, fixation members 40 are solder bonded to the connection pads 11 of the wiring board 10. Here, FIG. 3A is a plan view, FIG. 3B is a sectional view taken along a line IIIb-IIIb of FIG. 3A, and FIG. 3C is a sectional view taken along a line IIIc-IIIc of FIG. 3A.

Figure 4A:
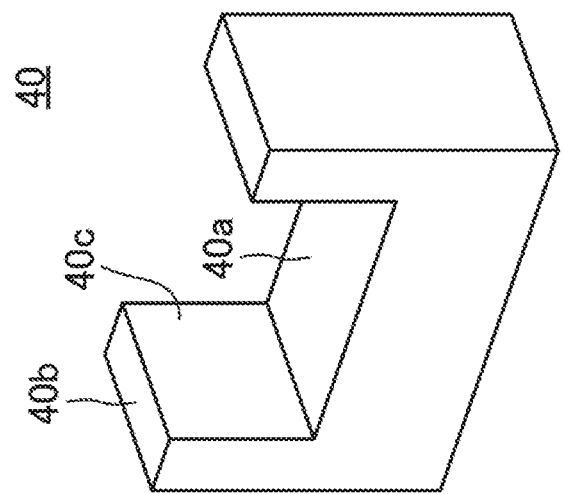
FIG. 4A is a perspective view of a fixation member when viewed from above.
Figure 4B:
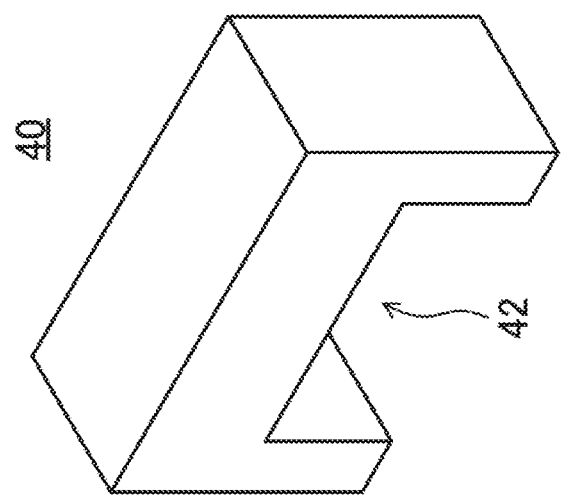
FIG. 4B is a perspective view of the fixation member when viewed from below.

FIGS. 4A and 4B are views showing an example of the configuration of each fixation member 40. FIG. 4A is a perspective view of the fixation member 40 when viewed from above. FIG. 4B is a perspective view of the fixation member 40 when viewed from below.

As shown in FIGS. 4A and 4B, the fixation member 40 includes a block having a substantially U-shape in section in which a recess portion 42 is formed. The fixation member 40 is provided with an opposing surface 40a, solder mount surfaces 40b, and side faces 40c. The opposing surface 40a is a face which is opposed to the upper surface of the optical/electrical composite board 2 (the upper surface of the clad layer 23) with a certain distance interposed therebetween. The solder mount surfaces 40b are faces which are solder-bonded to the solders 12 of the wiring board 10. The side faces 40c are faces which are connected to the opposing surface 40a and the solder mount surfaces 40b so as to abut thereon vertically in a thickness direction.

As shown in FIG. 3C, the recess portion 42 of the fixation member 40 forms a space with the upper surface of the optical/electrical composite board 2. Specifically, the space is partitioned by the upper surface of the optical/electrical composite board 2, the opposing surface 40a and the side faces 40c.

Incidentally, the fixation members 40 can be mounted on the connection pads 11 of the wiring board 10, for example, by use of a chip mounter. The solders 12 on the connection pads 11 are reflowed so that the fixation members 40 can be solder bonded onto the wiring board 10.

It is preferable that, for example, each fixation member 40 is made of a metal material such as copper, a silicon material, a resin material, etc. In addition, as shown in FIG. 4B, a layer made of a material suitable for solder bonding may be further formed on the solder mount surfaces 40b of the fixation member 40 in advance.

Figure 5A:
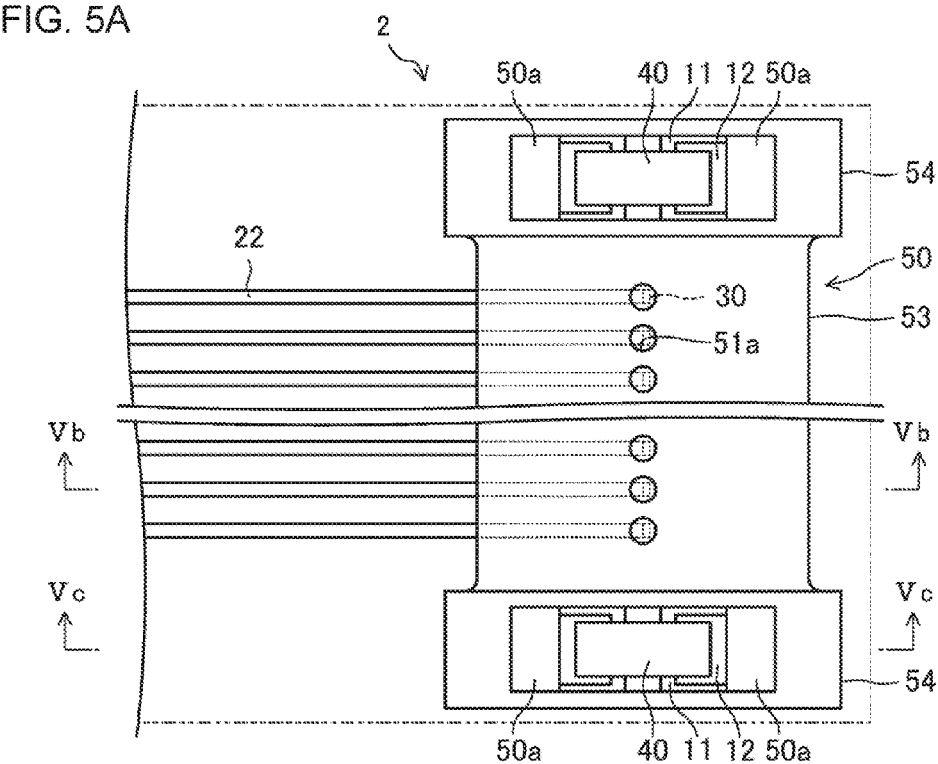
FIG. 5A is a plan view showing a step of the method for manufacturing the optical module according to the embodiment.
Figure 5B:
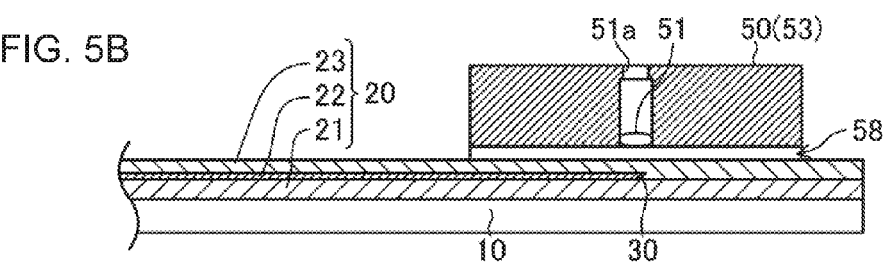
FIG. 5B is a sectional view taken along a line of Vb-Vb of FIG. 5A.
Figure 5C:
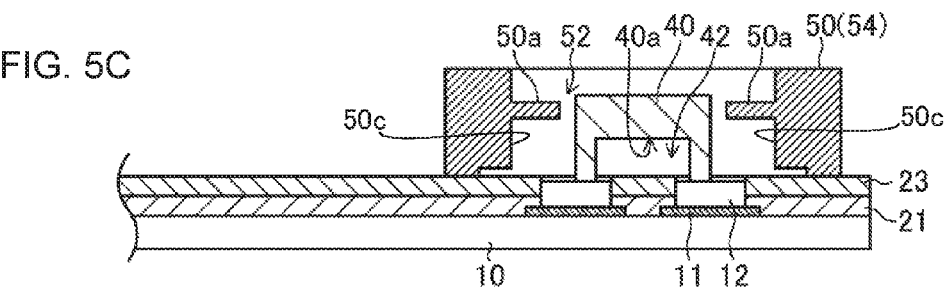
FIG. 5C is a sectional view taken along a line of Vc-Vc of FIG. 5A.

Next, as shown in FIG. 5A to 5C, a lens component 50 in which through holes 52 are formed is mounted on the optical/electrical composite board 2 (in detail, the clad layer 23) in a state in which the fixation members 40 are received in the through holes 52. FIG. 5A is a plan view, FIG. 5B is a sectional view taken along a line Vb-Vb of FIG. 5A and FIG. 5C is a sectional view taken along a line Vc-Vc of FIG. 5A.

Figure 6:
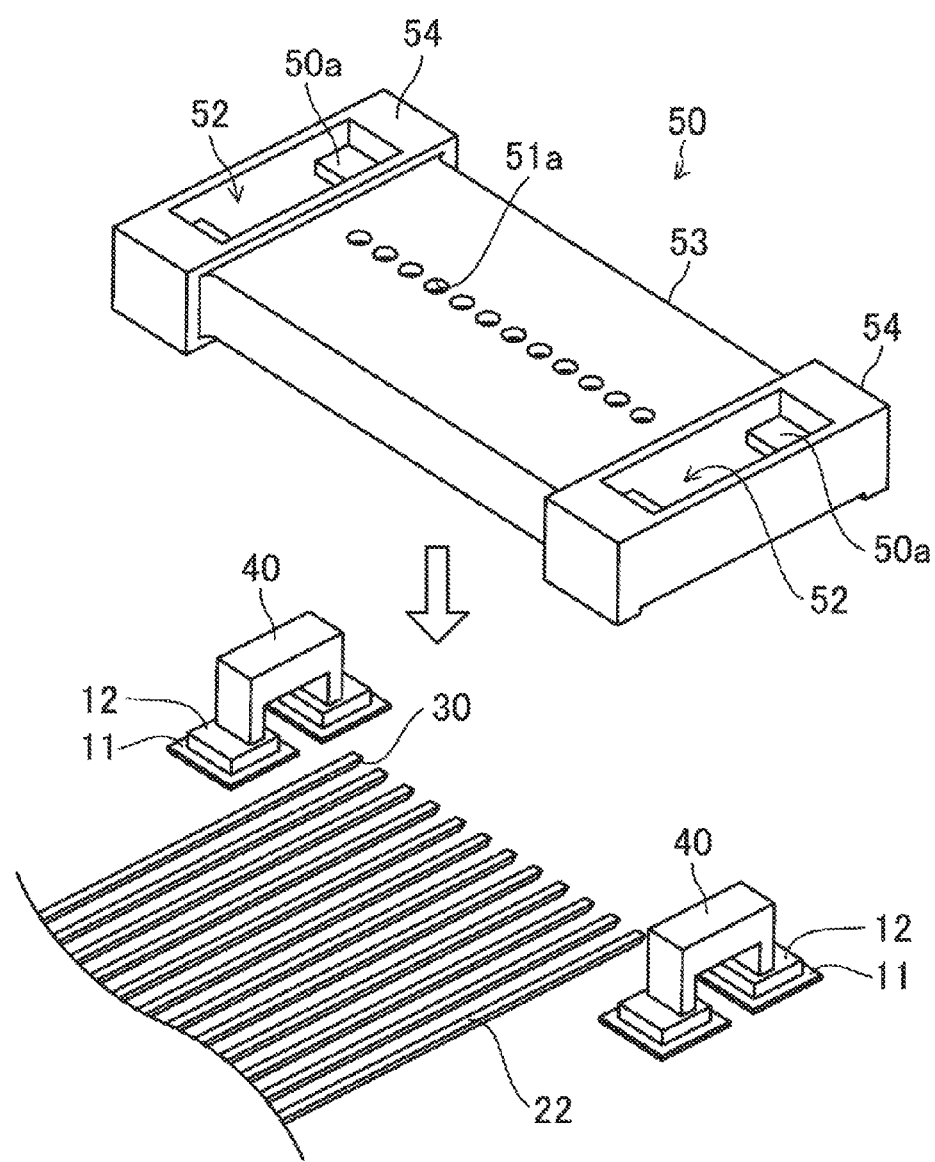
FIG. 6 is a perspective view showing a step of the method for manufacturing the optical module according to the embodiment.

FIG. 6 is a perspective view showing an example of the configuration of the lens component 50.

Figure 7A:
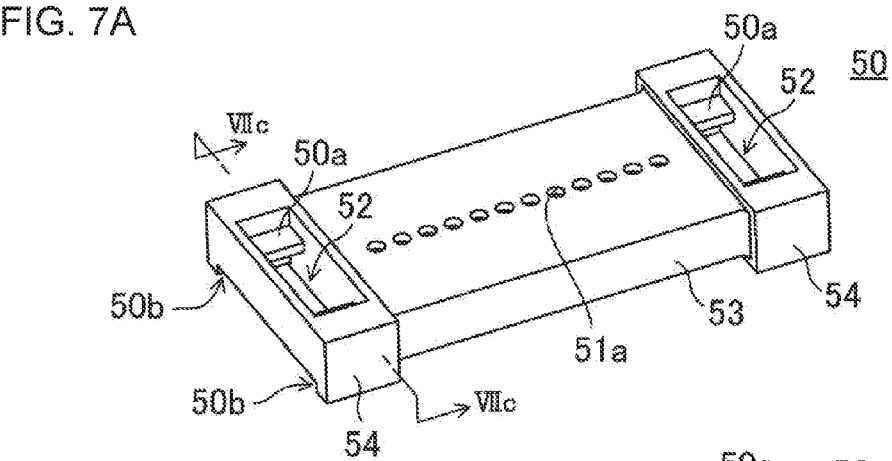
FIGS. 7A to 7C are views showing an example of the configuration of a lens component.
Figure 7B:
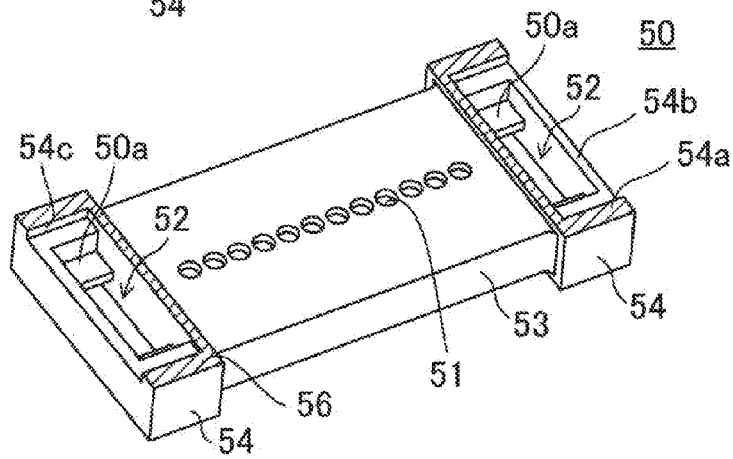
Figure 7C:
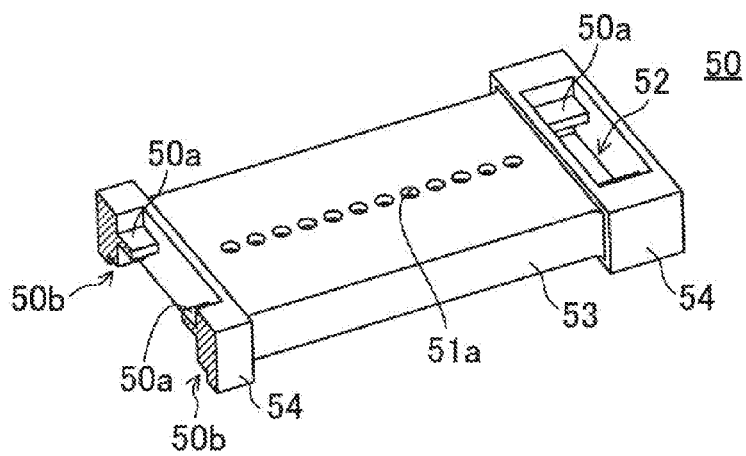
Figure 8A:
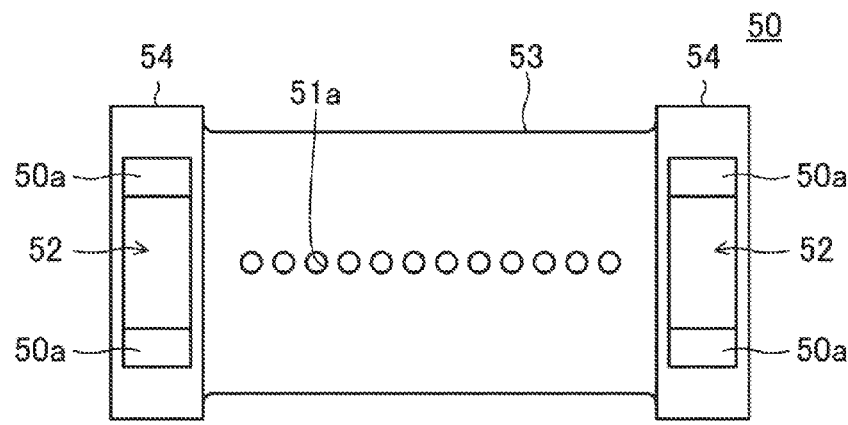
FIGS. 8A to 8C are views showing the example of the configuration of the lens component.
Figure 8B:
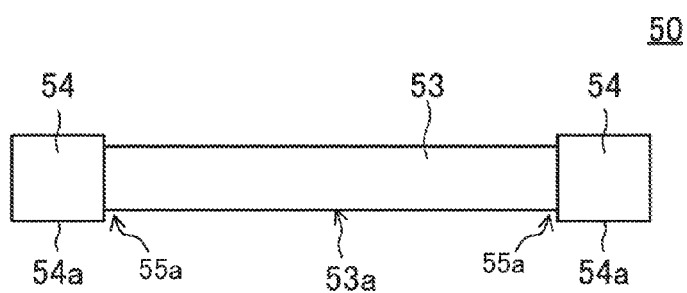
Figure 8C:
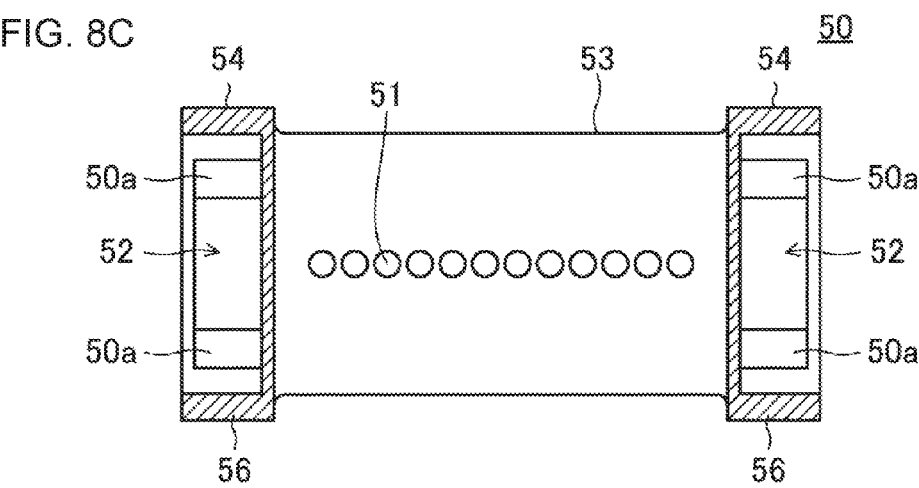

In addition, FIGS. 7A to 7C and FIGS. 8A to 8C are views showing details of the configuration of the lens component 50. Here, FIG. 7A is a perspective view of the lens component 50 when viewed from above, FIG. 7B is a perspective view of the lens component 50 when viewed from below, and FIG. 7C is a partially sectional perspective view taken along a line VIIc-VIIc of FIG. 7A. In addition, FIG. 8A is a plan view of the lens component 50, FIG. 8B is a side view of the lens component 50, and FIG. 8C is a bottom view of the lens component 50.

As shown in FIG. 5C, the lens component 50 is mounted on the optical/electrical composite board 2 (the clad layer 23).

As shown in FIG. 5A to 5C, FIG. 6, FIGS. 7A to 7C, and FIGS. 8A to 8C, the lens component 50 has a central section 53 and peripheral sections 54. Lenses 51 are arranged in the form of an array in the central section 53. The through holes 52 are formed in the peripheral sections 54. The lenses 51 are buried in grooves 51a formed in the central section 53.

In addition, as shown in FIG. 8B, a step portion 55a is formed in a boundary between a lower surface 53a of the central section 53 of the lens component 50 and a lower surface 54a of each peripheral section 54.

As shown in FIGS. 5A to 5C, FIG. 6, FIGS. 7A to 7C and FIGS. 8A to 8C, each peripheral section 54 of the lens component 50 is provided with protrusion portions 50a and step portions 50b. In addition, the peripheral section 54 has a contact face 54a, an opposing surface 54b and side faces 54c t at the upper surface side of the clad layer 23.

The contact face 54a is a face which makes contact with the upper surface of the clad layer 23, and which extends along one side on the central section 53 side of the lens component 50 and along sides perpendicular to the one side on the central section 53 side. In other words, the contact face 54a is a substantially U-shaped face. The opposing surface 54b is a face which is opposed to the upper surface of the optical/electrical composite board 2 (the upper surface of the clad layer 23) at a predetermined distance. The opposing surface 54b extends along an opposite side to the one side on the central section 53 side and along sides perpendicular to the opposite side to the one side on the central section 53 side. In other words, the opposing surface 54b is a U-shaped face. The side faces 54c are faces which are connected to the contact face 54a and the opposing surface 54b so as to abut thereon vertically in the thickness direction.

The peripheral section 54 has the protrusion portions 50a extending from an inner circumferential surface 50c where the through hole 52 is formed. The protrusion portions 50a are opposed to the upper surface of the optical/electrical composite board 2 (the upper surface of the clad layer 23) at a predetermined distance in the thickness direction of the optical/electrical composite board 2. In addition, the protrusion portions 50a are opposed to the fixation member 40 at a predetermined distance in a planar direction. In other words, the protrusion portions 50a are formed in positions out of contact with the upper surface of the optical/electrical composite board 2 (the upper surface of the clad layer 23) and the fixation member 40.

In addition, as shown in FIGS. 7A and 7C, the step portions 50b are formed in the bottom of the peripheral section 54 of the lens component 50 in the sectional shape of the peripheral section 54. Specifically, step portions 50b are formed in boundaries between the contact face 54a and the opposing surface 54b.

The lens component 50 can be mounted on the optical/electrical composite board 2, for example, by use of a chip mounter. On this occasion, the lens component 50 is aligned so that the centers of the lenses 51 can be located just above the centers of the optical path changing portions 30, as shown in FIG. 5A. After the lens component 50 is mounted on the optical/electrical composite board 2, the lens component 50 is temporarily fixed to the optical/electrical composite board 2 by an adhesive agent.

Figure 9A:
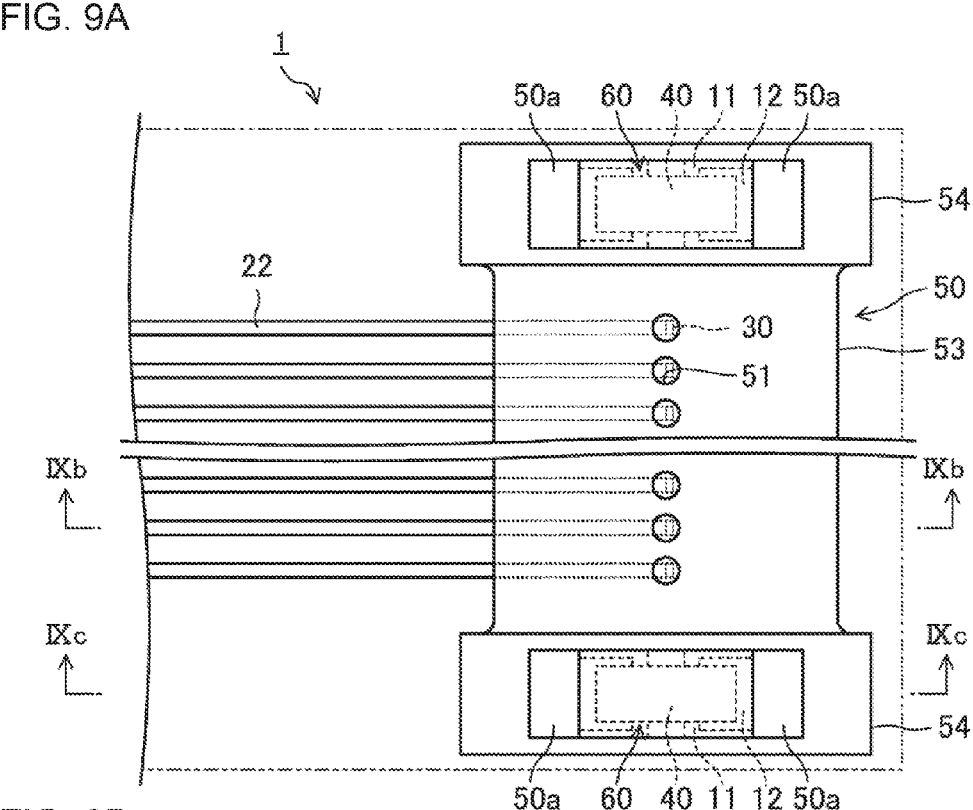
FIG. 9A is a plan view showing a step of the method for manufacturing the optical module according to the embodiment.
Figure 9B:
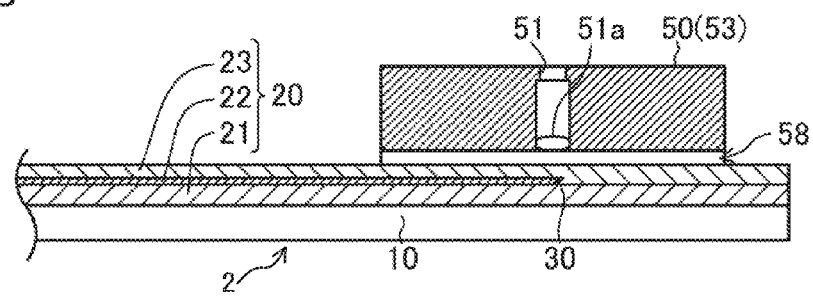
FIG. 9B is a sectional view taken along a line of IXb-IXb of FIG. 9A.
Figure 9C:
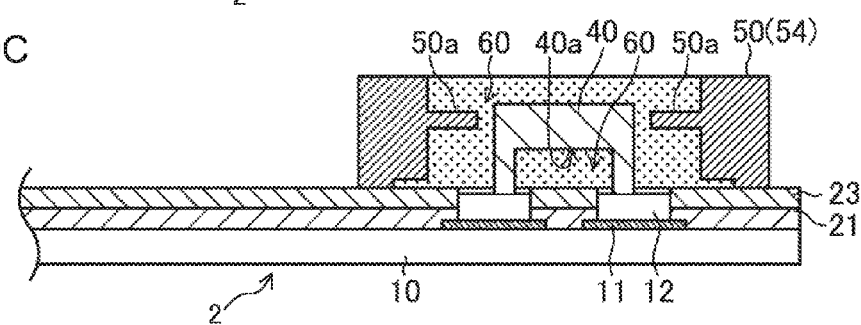
FIG. 9C is a sectional view taken along a line of IXc-IXc of FIG. 9A.

Next, the spaces except the fixation members 40 inside the through holes 52 of the lens component 50 are filled with a resin 60 (a resin portion), as shown in FIGS. 9A to 9C. Here, FIG. 9A is a plan view, FIG. 9B is a sectional view taken along a line IXb-IXb of FIG. 9A, and FIG. 9C is a sectional view taken along a line IXc-IXc of FIG. 9A.

Each of the through holes 52 can be filled with the resin 60 in such a manner that, for example, a potting resin consisting of a thermosetting resin is injected into the through hole 52 and then heated. In this manner, the lens component 50 is fixed to the optical/electrical composite board 2.

As shown in FIG. 9C, the resin 60 filled into the through hole 52 of the lens component 50 is also filled into a space between the opposing surface 40a formed in the fixation member 40 and the optical/electrical composite board 2, that is, into the recess portion 42 of the fixation member 40.

Further, the resin 60 is filled so that the protrusion portion 50*a* which is formed in the lens component 50 can be buried in the resin 60.

According to the embodiment, the lens component 50 is not directly fixed to optical/electrical composite board 2 (the clad layer 23) by an adhesive agent as in the background art but is fixed to the optical/electrical composite board 2 through the resin 60 filled into the through holes 52 and the fixation members 40. That is, since the fixation members 40 are fixed to the wiring board 10 by solider bonding, adhesive strength is very high in comparison with that when the fixation members 40 are fixed to the wiring board 10 by an adhesive agent. In addition, the lens component 50 is fixed to the fixation members 40 by the resin 60 filled into the through holes 52. On this occasion, the area in which the resin 60 makes contact with the surface of each of the fixation members 40 and the surface of the lens component 50 is very large. Therefore, adhesive strength with which the lens component 50 is fixed to the fixation members 40 by the resin 60 is very high due to an anchor effect. Accordingly, the adhesive strength of the lens component 50 fixed to the optical/electrical composite board 2 through the resin 60 filled into the through holes 52 and the fixation members 40 is much higher than adhesive strength of the lens component 50 directly fixed to the optical/electrical composite board 2 by an adhesive agent. Thus, the lens component 50 can be prevented from coming off from the optical/electrical composite board 2 even when, for example, large tensile load for detaching the optical fiber connector 100 mounted on the lens component 50 (in other words, an external force for pulling the lens component 50 upward) acts on the lens component 50.

Further, the opposing surfaces 40*a* opposed to the optical/electrical composite board 2 at the predetermined distance are provided in the fixation members 40. Thus, adhesive strength with which the lens component 50 is fixed to the optical/electrical composite board 2 can be enhanced more greatly. That is, when large tensile load acts on the lens component 50, there is a possibility that the lens component 50 may come off from the fixation members 40 together with the resin 60 if adhesive strength between the fixation members 40 and the resin 60 is weak. However, when the resin 60 is filled into the spaces between the opposing surfaces 40*a* and the optical/electrical composite board 2, that is, into the recess portions 42 of the fixation members 40 as shown in FIG. 9C, the resin 60 in these places is connected to the resin 60 around the fixation members 40. Accordingly, the whole of the resin 60 can be prevented from coming off from the fixation members 40. As a result, the lens component 50 can be prevented from coming off from the optical/electrical composite board 2 together with the resin 60.

Further, the protrusion portions 50*a* are provided in the inner circumferential surface 50*c* where the through holes 52 are formed. The protrusion portions 50*a* are opposed to the optical/electrical composite board 2 at the predetermined distance. Thus, adhesive strength with which the lens component 50 is fixed to the optical/electrical composite board 2 can be enhanced more greatly. That is, when large tensile load acts on the lens component 50, there is a possibility that the lens component 50 may come off from the resin 60 if adhesive strength between the lens component 50 and the resin 60 is weak. However, when the resin 60 is filled so that the protrusion portions 50*a* can be buried in the resin 60 as shown in FIG. 9C, the protrusion portions 50*a* serves as resistances against removal of the lens component 50 from the resin 60. Accordingly, the lens component 50 can be prevented from coming off from the optical/electrical composite board 2 together with the resin 60.

Further, the step portions 50*b* are formed in the bottom of each of the peripheral sections 54 of the lens component 50 in the sectional shape of the peripheral section 54, as shown in FIGS. 7A and 7C. Thus, the resin 60 can be also filled into the space between the step portions 50*b* and the optical/electrical composite board 2, as shown in FIG. 9C. Thus, the contact area between resin 60 and the optical/electrical composite board 2 can be increased. Accordingly, the adhesive strength with which the lens component 50 is fixed to the optical/electrical composite board 2 can be enhanced more greatly.

On the other hand, the steps 55*a* are formed in the boundaries between the lower surface 53*a* of the central section 53 of the lens component 50 and the lower surfaces 54*a* of the peripheral sections 54, as shown in FIG. 8B. Thus, a gap 58 is formed between the lens component 50 and the wiring board 10 in the central section 53 of the lens component 50, as shown in FIG. 9B. On this occasion, the lens component 50 is mounted so that only the contact faces 54*a* of the peripheral sections 54 can abut against the optical/electrical composite board 2, as shown in FIG. 7B. Accordingly, the contact faces 54*a* of the peripheral sections 54 dam up the resin 60 injected into the through holes 52 so that the resin 60 can be prevented from flowing into the gap 58. In this manner, it is possible to prevent a lens effect from deteriorating due to the resin 60 flowing into the gap 58. In addition, it is possible to release an excessive resin from gaps provided on opposite sides to the central section 53 side due to the steps.

In the embodiment, alignment accuracy is not particularly required in a step of solder-bonding the fixation members 40 onto the connection pads 11 of the wiring board 10, as shown in FIGS. 3A to 3C. The reason for this is that in a step of mounting the lens component 50 on the optical/electrical composite board 2, the fixation members 40 and the lens component 50 are not aligned with each other but positional displacement of the fixation members 40 can be allowed as long as the fixation members 40 can be received in the through holes 52 of the lens component 50, as shown in FIGS. 5A to 5C.

In addition, in the embodiment, in a step of filling a resin into the through holes 52 of the lens component 50 as shown in FIGS. 9A to 9C, a potting resin is poured into the through holes 52 in a state in which the lens component 50 mounted on the optical/electrical composite board 2 has been temporarily fixed to the optical/electrical composite board 2 by an adhesive agent, and then the potting resin is heated and fixed. Accordingly, positional displacement of the lens component 50 in the resin filling step can be prevented.

In addition, it may be also assumed that, for example, a step of mounting an electronic chip etc. on the optical/electrical composite board 2 by solder reflow is added after the lens component 50 is mounted on the optical/electrical composite board 2. In this case, the solders by which the fixation members 40 are fixed are melted once. However, the fixation members 40 may be fixed by the thermosetting resin 60, as shown in FIG. 9C. Accordingly, positional displacement of the fixation members 40 can be prevented from being generated even when the solder reflow step is added.

As shown in FIGS. 9A to 9C, the optical module 1 includes the optical/electrical composite board 2, which includes the wiring board 10, the optical waveguides 20, and the optical path changing portions 30, and the lens component 50. The optical waveguides 20 are disposed on the wiring board 10. The optical path changing portions 30 are provided at the end portions of the optical waveguides 20. The lens component 50 is mounted on the optical/electrical composite board 2. The lenses 51 for collecting light beams from the optical path changing portions 30 are arranged in the lens component 50. The fixation members 40 are solder bonded onto the wiring board 10. The lens component 50 is mounted on the optical/electrical composite board 2 in the state in which the fixation members 40 are received in the through holes 52 formed in the lens component 50. In addition, the resin 60 is filled into the spaces except the fixation members 40 inside the through holes 52.

With such a configuration, adhesive strength of the lens component 50 to the optical/electrical composite board 2 can be enhanced in the optical module 1 Thus, it is possible to prevent the lens component 50 from coming out from the optical/electrical composite board 2 even when, for example, large tensile load for detaching the optical fiber connector 100 mounted on the lens component 50 acts on the lens component 50.

In the embodiment, it is preferable that the fixation members 40 have the opposing surfaces 40a opposed to the optical/electrical composite board 2 at a predetermined distance and the resin 60 is filled into the spaces between the opposing surfaces 40a and the optical/electrical composite board 2. Thus, adhesive strength of the lens component 50 to the optical/electrical composite board 2 can be enhanced more greatly.

In addition, in the embodiment, it is preferable that the lens component 50 has the protrusion portions 50a which are provided in the inner circumferential surface 50c where the through holes 52 are formed and which is opposed to the optical/electrical composite board 2 at a predetermined distance, and the resin 60 is filled on that the protrusion portions 50a can be buried in the resin 60. Thus, adhesive strength of the lens component 50 to the optical/electrical composite board 2 can be enhanced further greatly.

In addition, in the embodiment, it is preferable that the lens component 50 has the central section 53 where the lenses 51 are arranged and the peripheral sections 54 where the through holes 52 are formed, the steps portions 55a are formed in the boundaries between the lower surface 53a of the central section 53 and the lower surfaces 54a of the peripheral sections 54, and the gap 58 is formed between the lower surface 53a of the central section 53 and the optical/electrical composite board 2. Thus, it is possible to prevent the lens effect of the lens component 50 from deteriorating.

As described above, the preferred embodiment and the modifications are described in detail. However, the present invention is not limited to the above-described embodiment and the modifications, and various modifications and replacements are applied to the above-described embodiment and the modifications without departing from the scope of claims.

Figure 10A:
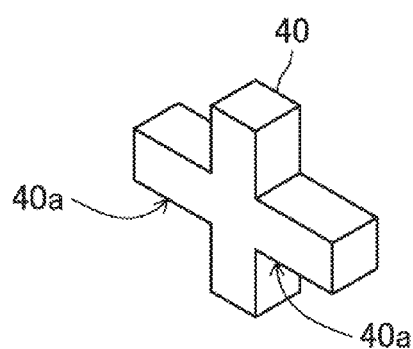
FIG. 10A is a view showing another configuration of the fixation member.
Figure 10B:
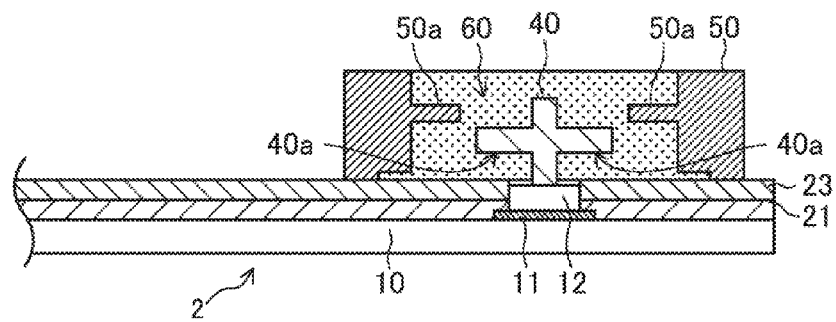
FIG. 10B shows a state where the fixation member and the lens component are mounted on the optical/electrical composite board.

For example, in the aforementioned embodiment, the block having a substantially U-shape in section has been described as each of the fixation members 40 by way of example, as shown in FIGS. 4A and 4B. However, the fixation member 40 is not limited thereto. For example, a block having the shape of a cross in section may be used as the fixation member 40, as shown in FIG. 10A. In this case, the fixation member 40 has opposing surfaces 40a and 40a, which are opposed to the optical/electrical composite board 2 at a predetermined distance. The resin 60 is filled into spaces between the facing faces 40a and 40a and the optical/electrical composite board 2, as shown in FIG. 10B.

In addition, in the aforementioned embodiment, the lens component 50 having the shape as shown in FIGS. 7A to 7C and FIGS. 8A to 8C has been described as the lens component 50 by way of example. However, the lens component 50 is not limited thereto but may take various forms. In this case, it is preferable that the lens component 50 has the protrusion portions 50a which are provided in the inner circumferential surface where the through holes 52 are formed and which are opposed to the optical/electrical composite board 2 at a predetermined distance.

In addition, the configuration in which the light-emitting elements 200 are mounted on the wiring board 10 and in the positions corresponding to the optical path changing mirrors 30a at the one end portions of the core layers 22 as shown in FIG. 1 has been shown as the optical module 1 by way of example. However, the optical module 1 is not limited thereto but may have various configurations. For example, light-receiving elements may be mounted on the wiring board 10 and in the positions corresponding to the optical path changing mirrors 30a at the one end portions of the core layers 22. In this case, light beams incident on the lenses 51 of the lens component 50 from the optical fibers 110 through the optical fiber connector 100 are reflected by the optical path changing mirrors 30b, propagated through the core layers 22, and reflected again by the optical path changing mirrors 30a so as to be incident on the light-receiving elements.

Incidentally, description has been made in the aforementioned embodiment that the fixation members 40 and the lens component 50 are mounted on the optical/electrical composite board 2. However, the meaning of this description may include the case where the fixation members 40 and the lens component 50 are directly or indirectly mounted on the upper surface of the wiring board 10 and the case where the fixation members 40 and the lens component 50 are directly or indirectly mounted on the upper surface of the clad layer 23.

Various aspects of the subject matter described herein are set out non-exhaustively in the following numbered clauses:

1) A method of manufacturing an optical module, comprising:
   a) providing an optical/electrical composite board, wherein the optical/electrical composite board comprises: a wiring board; an optical waveguide disposed on the wiring board and configured to guide light; and a first optical path changing portion disposed at one end portion of the optical waveguide to change an optical path of the light travelling in the optical waveguide,
   b) fixing a fixation member to the optical/electrical composite board;
   c) disposing a lens component on the optical/electrical composite board such that the fixation member is disposed in a through hole which is formed through the lens component; and
   d) filling a resin portion in the through hole such that the fixation member is embedded in the resin portion.

2) The method of clause (1), wherein the step (b) comprises solder-bonding the fixation member to the optical/electrical composite board.

3) The method of clause (1), wherein the step (c) comprises temporarily fixing the lens component to the optical/electrical composite board using an adhesive agent.

4) The method of clause (2), wherein the step (a) comprising forming a connection pad on an upper surface of the wiring board, and the step a)) comprises solder-bonding the fixation member to the connection pad.

What is claimed is:

1. An optical module comprising:
an optical/electrical composite board comprising:
   a wiring board;
   an optical waveguide formed directly on the wiring board and configured to guide light; and
   a first optical path changing portion formed directly on one end portion of the optical waveguide to change an optical path of the light travelling in the optical waveguide,
a lens component comprising a lens configured to collect the light emitted from the first optical path changing portion; and
a fixation member fixed to the optical/electrical composite board,
wherein
a through hole is formed through the lens component,
the lens component is disposed on the optical/electrical composite board such that the fixation member is disposed in the through hole, and
a resin portion is provided in the through hole such that the fixation member is embedded in the resin portion.

2. The optical module of claim 1, wherein the fixation member is solder bonded to the optical/electrical composite board.

3. The optical module of claim 1, wherein
the fixation member has an opposing surface opposed to the optical/electrical composite board with a certain distance therebetween, and
at least a portion of the resin portion is provided in a space between the optical/electrical composite board and the opposing surface of the fixation member so as to contact the opposing surface.

4. The optical module of claim 1, wherein
the lens component further comprises a protrusion portion protruding from an inner circumferential surface defining the through hole, and
the protrusion portion is embedded in the resin portion.

5. The optical module of claim 1, wherein
the lens component has a central section where the lens is arranged, and a peripheral section where the through hole is formed,
a step is formed in a boundary between a lower surface of the central section, which is opposed to the optical/electrical composite board, and a lower surface of the peripheral section, which is opposed to the optical/electrical composite board, and
a gap is formed between the lower surface of the central section and the optical/electrical composite board.

6. The optical module of claim 1, wherein
the lens component further comprises a mounting portion configured to allow an optical fiber connector to be mounted on the lens component, and
the optical fiber connector is attached to an end portion of an optical fiber configured to receive the light collected by the lens.

7. The optical module of claim 1, further comprising an optical element disposed on the optical/electrical composite board, and
wherein the optical/electrical composite board further comprises a second optical path changing portion disposed at the other end portion of the optical waveguide and configured to optically couple the optical element and the optical waveguide.

* * * * *